United States Patent
Roberts

(10) Patent No.: US 11,477,608 B1
(45) Date of Patent: *Oct. 18, 2022

(54) MESSAGING SYSTEMS FOR SHARING LOCATION SPECIFIC INFORMATION

(71) Applicant: TipTags Inc., Wilmington, DE (US)

(72) Inventor: Timothy G. Roberts, North Hollywood, CA (US)

(73) Assignee: TipTags Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,760

(22) Filed: Dec. 4, 2020

Related U.S. Application Data

(63) Continuation of application No. 16/696,581, filed on Nov. 26, 2019, now Pat. No. 10,893,382, which is a continuation of application No. 16/199,397, filed on Nov. 26, 2018, now Pat. No. 10,555,122, which is a continuation of application No. 15/475,923, filed on Mar. 31, 2017, now Pat. No. 10,178,507.

(60) Provisional application No. 62/327,282, filed on Apr. 25, 2016.

(51) Int. Cl.
H04W 4/02 (2018.01)
H04W 4/12 (2009.01)

(52) U.S. Cl.
CPC .............. H04W 4/026 (2013.01); H04W 4/12 (2013.01)

(58) Field of Classification Search
CPC ......... H04W 4/026; H04W 4/12; H04W 4/02; G06F 3/0481
USPC .................................................... 455/456.6
See application file for complete search history.

(56) References Cited

U.S. PATENT DOCUMENTS

| | | | | |
|---|---|---|---|---|
| 6,405,129 B1* | 6/2002 | Yokota | ............... | G01C 21/3682 |
| | | | | 701/438 |
| 6,785,716 B1* | 8/2004 | Nobakht | ........... | H04L 29/12594 |
| | | | | 348/E7.071 |
| 7,373,244 B2* | 5/2008 | Kreft | ..................... | G06F 16/235 |
| | | | | 340/988 |
| 7,797,642 B1* | 9/2010 | Karam | ................ | G06Q 10/107 |
| | | | | 715/764 |
| 7,912,634 B2* | 3/2011 | Reed | ..................... | G09B 29/106 |
| | | | | 340/995.14 |
| 7,920,963 B2* | 4/2011 | Jouline | ............... | G06F 16/9537 |
| | | | | 701/420 |
| 8,364,171 B2 | 1/2013 | Busch et al. | | |
| 9,119,027 B2* | 8/2015 | Sharon | ................ | G06F 21/6245 |

(Continued)

OTHER PUBLICATIONS

Co-pending U.S. Appl. No. 16/696,581, inventor Roberts; Timothy G., filed Nov. 26, 2019.

(Continued)

*Primary Examiner* — William Nealon
(74) *Attorney, Agent, or Firm* — Wilson Sonsini Goodrich & Rosati

(57) ABSTRACT

The present disclosure provides a computer-implemented messaging system for sharing location specific information. Users of the messaging system may provide a message about a specific location. The message can be displayed as a tag. The messaging system can comprise a map-based interface, and a plurality of tags on the map-based interface. The tags may be (i) positioned adjacent to a specific location and (ii) oriented to point towards the specific location. The tags may be configured to display at least a portion of a message about the specific location.

20 Claims, 6 Drawing Sheets

(56) References Cited

U.S. PATENT DOCUMENTS

| | | | |
|---|---|---|---|
| 9,311,750 B2* | 4/2016 | Moore | G01C 21/3617 |
| 9,459,756 B2* | 10/2016 | Choi | G06F 3/0481 |
| 9,679,068 B2* | 6/2017 | Saretto | G06Q 30/02 |
| 10,051,417 B2 | 8/2018 | Borghei et al. | |
| 10,178,507 B1 | 1/2019 | Roberts | |
| 10,555,122 B2 | 2/2020 | Roberts | |
| 2003/0100326 A1 | 5/2003 | Grube et al. | |
| 2007/0281689 A1* | 12/2007 | Altman | H04W 4/023 |
| | | | 455/435.1 |
| 2007/0281690 A1* | 12/2007 | Altman | H04L 67/18 |
| | | | 455/435.1 |
| 2008/0132252 A1 | 6/2008 | Altman et al. | |
| 2009/0254840 A1* | 10/2009 | Churchill | H04L 51/04 |
| | | | 715/753 |
| 2009/0298461 A1* | 12/2009 | O'Reilly | H04M 3/42374 |
| | | | 455/404.2 |
| 2009/0325603 A1* | 12/2009 | Van Os | H04L 67/18 |
| | | | 455/456.2 |
| 2010/0325194 A1* | 12/2010 | Williamson | H04L 63/107 |
| | | | 709/203 |
| 2011/0083101 A1* | 4/2011 | Sharon | H04W 4/21 |
| | | | 709/204 |
| 2011/0238751 A1 | 9/2011 | Belimpasakis et al. | |
| 2011/0238762 A1* | 9/2011 | Soni | H04W 4/021 |
| | | | 709/206 |
| 2012/0017166 A1* | 1/2012 | Watt | G06F 16/29 |
| | | | 715/771 |
| 2012/0185562 A1* | 7/2012 | Koo | G06F 9/541 |
| | | | 709/217 |
| 2013/0027429 A1* | 1/2013 | Hogg | G06F 3/04817 |
| | | | 345/633 |
| 2013/0130640 A1* | 5/2013 | Yang | H04W 4/90 |
| | | | 455/435.1 |
| 2013/0132808 A1* | 5/2013 | Whiting | H04L 67/18 |
| | | | 715/202 |
| 2013/0325964 A1* | 12/2013 | Berberat | H04W 4/185 |
| | | | 709/204 |
| 2013/0326366 A1* | 12/2013 | Choi | H04W 4/12 |
| | | | 715/752 |
| 2014/0163861 A1* | 6/2014 | Beaurepaire | G06Q 50/00 |
| | | | 701/400 |
| 2014/0236542 A1 | 8/2014 | Abhyanker et al. | |
| 2014/0365580 A1* | 12/2014 | Azenkot | H04W 4/026 |
| | | | 709/205 |
| 2015/0002536 A1* | 1/2015 | Mendis | G09G 5/40 |
| | | | 345/619 |
| 2015/0005010 A1 | 1/2015 | Zhang et al. | |
| 2015/0032735 A1* | 1/2015 | Van Os | G06F 16/248 |
| | | | 707/722 |
| 2015/0289113 A1* | 10/2015 | Cochran | H04W 4/029 |
| | | | 701/472 |
| 2015/0334077 A1 | 11/2015 | Feldman et al. | |
| 2016/0191637 A1 | 6/2016 | Memon et al. | |
| 2017/0223248 A1* | 8/2017 | Oshima | H04B 10/116 |
| 2018/0176166 A1 | 6/2018 | Philipson et al. | |
| 2018/0245942 A1* | 8/2018 | Scarr | G01C 21/3635 |

OTHER PUBLICATIONS

U.S. Appl. No. 16/696,581 Notice of Allowance dated Sep. 25, 2020.
U.S. Appl. No. 15/475,923 Notice of Allowance dated Aug. 31, 2018.
U.S. Appl. No. 16/199,397 Notice of Allowance dated Sep. 13, 2019.
U.S. Appl. No. 16/199,397 Office Action dated Mar. 28, 2019.
U.S. Appl. No. 16/696,581 Office Action dated Jun. 22, 2020.
waze.com. Free Community-based Mapping, Traffic & Navigation App. Copyright 2006-2017 Waze Mobile. Accessed Jul. 5, 2017. 4 pages. URL:< https: www.waze.com="">.</https:>.

* cited by examiner

MESSAGING SYSTEMS FOR SHARING LOCATION SPECIFIC INFORMATION

CROSS-REFERENCE

This application is a continuation of U.S. application Ser. No. 16/696,581, filed Nov. 26, 2019, which is a continuation of U.S. application Ser. No. 16/199,397, filed Nov. 26, 2018, which is a continuation of U.S. application Ser. No. 15/475,923, filed Mar. 31, 2017, which claims the benefit of U.S. Provisional Application No. 62/327,282, filed Apr. 25, 2016, each of which applications is entirely incorporated herein by reference.

BACKGROUND

Locating technologies such as the Global Positioning System (GPS) are becoming increasingly advanced and can often locate or track an object relative to one or more reference points (such as a satellite or another object) with high accuracy and precision. Such locating systems may provide maps with real-time positioning capabilities from a wide array of portable and non-portable electronic devices, including computers, phones, wearable devices, vehicle dashboards, remote controllers, trackers, and navigators. Likewise, an ecosystem of social networks interconnecting any number of individuals and/or entities may be equally accessible from a wide array of portable and non-portable electronic devices.

SUMMARY

Between the ubiquity of maps with real-time positioning capabilities and the ecosystem of social networks, recognized herein is a need for a messaging system where users can share location-specific information.

An aspect of the present disclosure provides a computer-implemented method for sharing location specific information between users of a messaging system. The messaging system can be programmed or otherwise configured to implement the method. In another aspect, the messaging system can be an integrated part of an existing social networking system, such as via use of one or more application program interfaces (APIs). Alternatively or in addition, the messaging system can be its own independent social networking system.

The computer-implemented method for sharing location specific information can comprise: receiving, over a computer network, at a messaging system programmed to facilitate sharing of location specific information, a first message about a first location from a first user; providing, to the first user, a first tag on a map-based interface, wherein the first tag displays at least a portion of the first message, wherein the map-based interface displays to the first user a map containing the first location; receiving, from the first user, position and orientation instructions for placement of the first tag on the map-based interface, wherein the first tag is (i) positioned adjacent to the first location, and (ii) oriented to point towards the first location; and displaying, over the computer network, by the messaging system, for presentation to a second user, the first tag placed on the map-based interface according to the position and orientation instructions from the first user.

The method can further comprise receiving a first rating of the first message from the second user. The messaging system may then determine an aggregate rating of the first message, wherein the aggregate rating is a compilation of all individual ratings received for the first message from users of the messaging system, including the first rating. The aggregate rating can be a numerical score. For example, the aggregate rating can be a mean, an average, a median, or other statistical determination of the individual ratings. In some cases, the first tag can display at least the aggregate rating of the first message.

Each message can comprise at least a title of the message and a category and a description of the location the message is related to. In some cases, the tag can be displayed as a different color based on different categories of the information contained in the message.

The method can further comprise establishing a connection between the first user and the second user in the messaging system, wherein the connection is initiated by either the first user or the second user, and wherein the connection is stored in the messaging system. For example, the connection can be part of a social networking system.

In some instances, the messaging system can provide a current location of a user viewing a map-based interface of the messaging system on the map-based interface. In some instances, the messaging system can provide, on the map-based interface, direction instructions between the current location of the user and the location of any tag and/or message. In some instances, the messaging system can provide, on the map-based interface, direction instruction between any two tags or between any location and a tag.

Upon a request by a user, the messaging system can display the entire message of a tag. In some cases, the request can be a user command, such as a touch command or a mouse command.

In another aspect, provided is a computer-implemented messaging system for sharing location specific information that can implement the above method. The messaging system can comprise one or more processors, a display, and a memory, communicatively coupled to the one or more processors, including instructions executable by the one or more processors to present on the display, a map-based interface, and a plurality of tags on the map-based interface, wherein each tag of the plurality of tags is (i) positioned adjacent to a specific location, (ii) oriented to point towards said specific location, and (iii) configured to display at least a portion of a message about the specific location.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "user," as used herein, generally refers to an individual or entity that is capable of providing, receiving, and/or sharing information related to a location. The user can be part of, or registered to, a messaging system for sharing location specific information. The messaging system may be part of a social network. The user can be a member of the general community with access to location specific information in the system. The user can be an anonymous member of the general community. Registered users of the messaging system may have a unique profile with the messaging system.

The term "social network," as used herein, generally refers to a social structure comprising at least one set of social entities (such as, e.g., individuals or organizations). The social network may have a set of the dyadic ties or connections (or links) between these entities. Such ties or connections may be complex (e.g., first degree connections, second degree connections, third degree connections, etc.). A social network can include various networks in which a user interacts with other users, such as a social network, education network and/or work network. A social network of a user can be characterized by, for example, a contacts list (e.g., address book, email contacts list) or a social media network (e.g., Facebook® friends list, Google+® friends list, LinkedIn® contacts, Twitter® Following list) of the user. A user that is a member of a social network may have a unique profile with the social network.

Provided herein are messaging systems for sharing location-specific information. A messaging system can be an integrated part of an existing social networking system (e.g., Facebook®, Google+®, Twitter®, Instagram®, etc.), such as via use of one or more application program interfaces (APIs). Alternatively or in addition, the messaging system can be its own independent social networking system.

Figure 1:
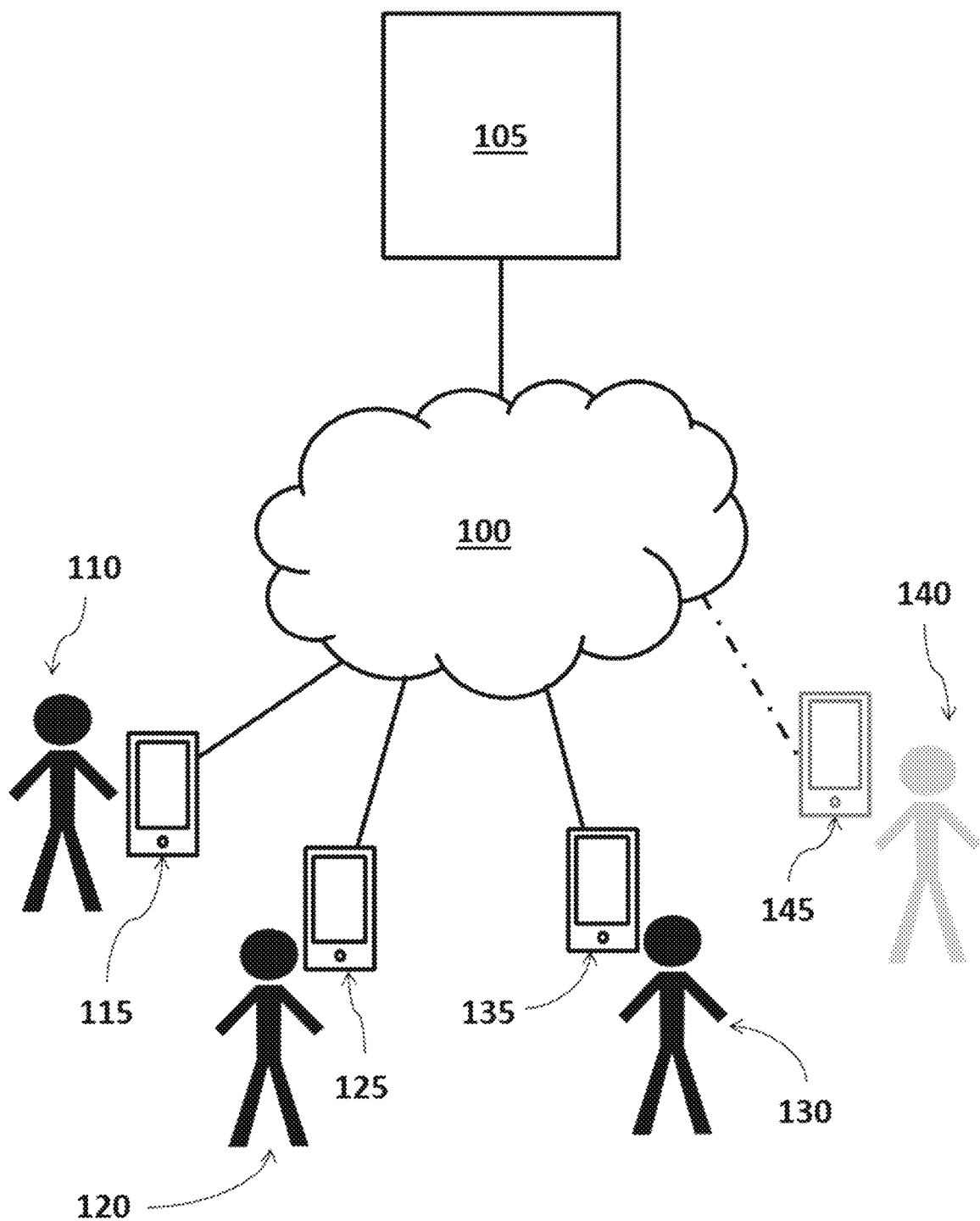
FIG. 1 shows a schematic illustration of a messaging system communicating with multiple users.

The messaging system may communicate with multiple users. FIG. 1 shows a schematic illustration of a messaging system communicating with multiple users. For example, a first user 110, a second user 120, a third user 130, and an nth user 140 may communicate with the system 100. A plurality of users may communicate with the system simultaneously. Alternatively, only one user can be communicating with the system at a single point in time. The users communicating with the system can be registered users of the system or members of the general community with access to the system. The users may participate in the system to provide information related to a location, receive information related to the location, share information related to a location for example to a specific user or to a specific group of users or to all users of the system, and/or provide feedback on information related to the location. The system may comprise a server 105. Any description herein of a server may apply to one or more servers or other devices that may individually or collectively perform any of the steps described elsewhere herein. Alternatively or in addition, the system may be implemented using a cloud computing infrastructure or a peer-to-peer configuration.

The server 105 may comprise known computing components, such as one or more processors, one or more memory devices storing software instructions executed by the processor(s), and data. A server can have one or more processors and at least one memory for storing program instructions. The one or more processors can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs (application specific integrated circuits), special purpose computers, or general purpose computers. While FIG. 1 illustrates a single server, in some embodiments, multiple devices may implement the functionality associated with the server. The server 105 can be a messaging server.

A user may communicate with the system with the aid of a computing device. A plurality of users may communicate with the system with the aid of a single computing device. Alternatively or in addition, each user may communicate with the system with an independent device. For example, a first user can use a first computing device 115, a second user can use a second computing device 125, a third user can use a third computing device 135, and an nth user can use an nth computing device 145. The computing device may comprise an interface. The interface may include a display to show graphic and/or textual information to the user. The interface may include one or more user interactive interfaces (e.g., GUI) that accept a user input.

In some instances, the computing device may be a mobile device (e.g., smartphone, tablet, pager, personal digital assistant (PDA)), a computer (e.g., laptop computer, desktop computer, server), a wearable device (e.g., smartwatches), or a navigator (e.g., vehicle dashboard, portable navigators). A computing device can also include any other media content player, for example, a set-top box, a television set, a video game system, or any electronic device capable of providing or rendering data. The computing device may be portable.

The computing device may be handheld. The computing device may be a network device capable of connecting to a network, such as a local area network (LAN), wide area network (WAN) such as the Internet, a telecommunications network, a data network, or any other type of network.

A computing device may comprise one or more geo-location sensors that may be useful for detecting the location of the computing device. In some instances, the computing device may further comprise motion sensors that may be useful for detecting the location and/or tracking the motion of the computer device. For example, the geo-location sensors may use triangulation methods or Global Positioning Systems (GPS) to aid in determining a location and/or movement of the computing device. Alternatively, the computing device may use other locating or tracking systems such as the Ultra Wide Band (UWB), Real-Time Locating Systems (RTLS), and Local Positioning Systems (LPS) to aid in determining a location and/or movement of the computing device. A computing device may comprise an image capture device, or may be in operable communication with an image capture device such as a camera. The image capture device may be useful for capturing an image of any object (e.g., buildings, streets, scenery, etc.) within the user's environment.

The computing device may comprise memory storage units which may comprise non-transitory computer readable medium comprising code, logic, or instructions for performing one or more steps described above or further below. The computing device may comprise one or more processors communicatively coupled to the memory storage units. The one or more processors can be capable of executing one or more steps, for instance in accordance with the non-transitory computer readable media.

A user may provide information to the system using the computing device, such as through a user input interface. In some instances, user input interfaces may comprise user input buttons, switches, knobs, levers, keys, trackballs, touchpads, cameras, microphones, motion sensors, heat sensors, inertial sensors, touch sensors, or any combination of the above. Alternatively or in addition, the user may provide input through a touch-enabled display (e.g., touchscreen) comprising a graphical user interface (GUI). Any description herein of any specific type of user input interfaces, such as keys, may apply to any other type of user input interface. The user input interface may be integrated in the computing device (e.g., touchscreen in a touchphone, keyboard in a laptop, power button in a desktop computer processor, etc.) or otherwise communicatively coupled to one or more processors of the computing device via wired (e.g., USB cable, etc.) or wireless connection (e.g., Bluetooth, Wi-Fi, NFC, etc.). Wireless connections are described further below. In some instances, the computer system may comprise a plurality of user interfaces (e.g., mouse, keyboard, switches, cameras, microphones, buttons, etc.) communicatively coupled to the one or more processors of the computer system.

An aspect of the present disclosure provides a computer-implemented method for sharing location specific information between users of a messaging system. The messaging system can be programmed or otherwise configured to implement the method, such as using the server 105 and one or more electronic devices (e.g., computing devices) communicatively coupled to the server 105.

The method can comprise receiving from a user, at the messaging system, a message related to a specific location, and displaying a tag of the message adjacent to the specific location on a map-based interface. In some instances, the tag can be configured to point towards the specific location on the map-based interface. The user can determine a placement configuration of the tag on the map-based interface. The placement configuration can include instructions as to a placement location of the tag and an orientation of the tag.

Figure 2:
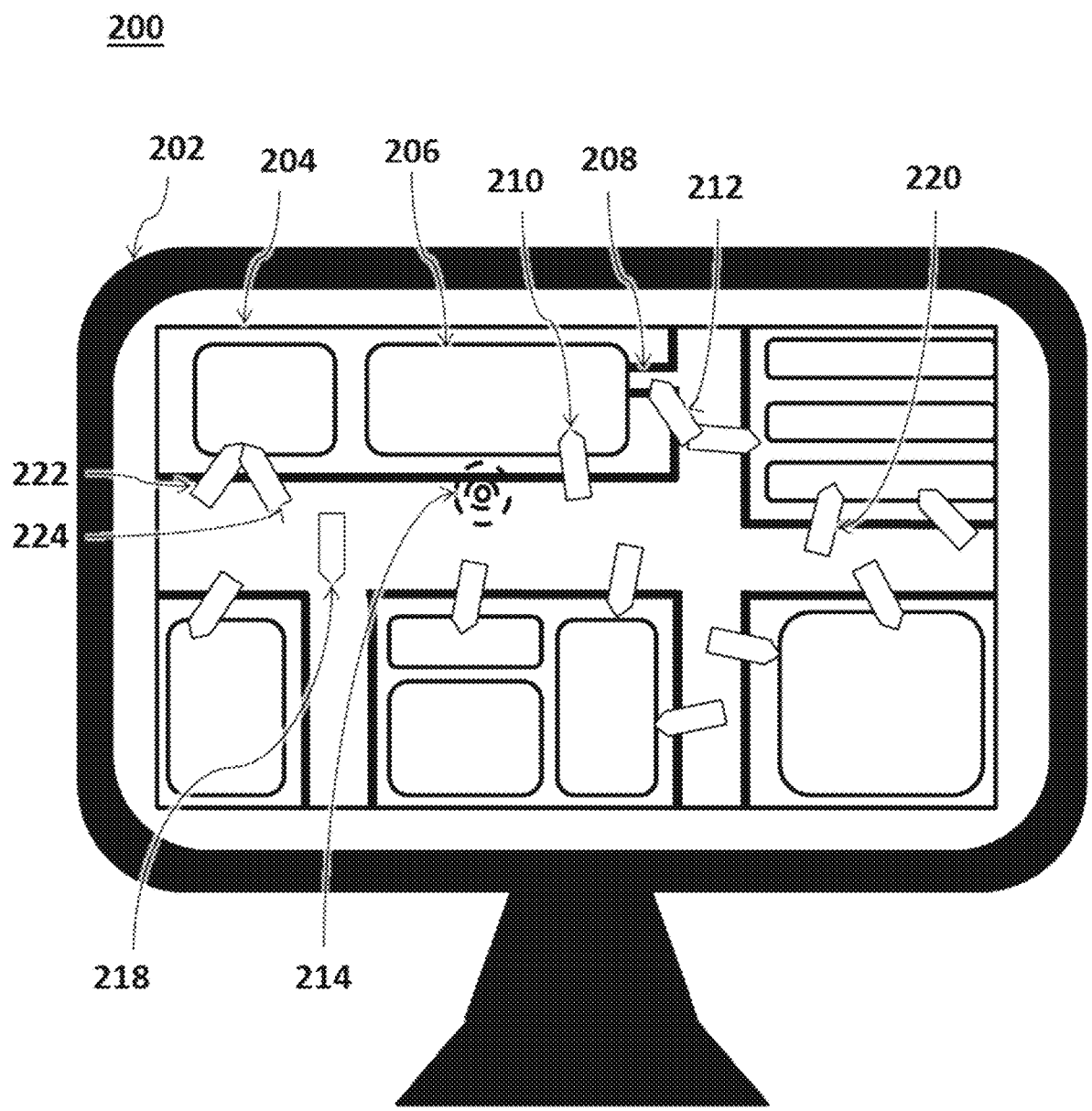
FIG. 2 shows a map-based interface on a display.

FIG. 2 shows an exemplary map-based interface of the messaging system on a display. The messaging system 200 can present to users a map-based interface 204 on, and/or be accessed from, a display 202 communicatively coupled to a computing device (e.g., the computing devices 115, 125, 135, 145 in FIG. 1) of a user. The display 202 can be an integrated display (e.g., touchscreen) of the computing device or a separate display device (e.g., external monitor) that is communicatively coupled to one or more processors of the computing device.

The messaging system 200 can provide a map-based interface 204 to users of the system. The map-based interface can be a user interactive interface. The map-based interface 204 can comprise a map. The map can be a two-dimensional map, a three-dimensional map, a color map, a line map, an abstract map, a map integrating virtual or augmented reality (VR or AR), a satellite map, a traffic map, a block map, a schematic map, a combination of the above, or any other type of map. The map may display symbolic (e.g., schematic) or real (e.g., comprising real or augmented images) representations of locations at one or more degrees of specificity. The map may distinguish continents, countries, states, cities, counties, neighborhoods, blocks, streets, alleys, intersections, walkways, car lanes, paths, buildings, furniture, floors, elevators, stairways, windows, doors, entranceways, gates, bridges, tunnels, zip codes, districts, zones, regions, campuses, oceans, rivers, streams, parks, forests, mountains, landmarks, or any other natural or artificial boundary or object that can be isolated as a separate location. For example, the map-based interface 204 can comprise rectangular or semi-rectangular blocks to represent buildings (such as building 206), and open lines to represent street boundaries (such as walkway 208), such as in FIG. 2. The user may select or change a degree of specificity of the map, such as by zooming in or zooming out of a segment of the map.

In some instances, the computing device providing the map-based interface 204 may be capable of identifying a current location 214 of a user, such as via one or more geolocation sensors using GPS or other locating methods. The messaging system may display the user's current location 214 on the map-based interface 204. The current location 214 can be displayed by a marker, icon, sticker, or any symbol that can comprise any shape, size, or color. In some instances, the current location 214 of the user can be updated in real-time. Real-time can include a response time of less than 1 second, tenths of a second, hundredths of a second, or a millisecond. All of the messaging system processes (e.g., updating current location, posting a tag, editing a tag, rating a tag, following a user, etc.) such as those described above and further below, is capable of happening in real-time. That is, the current location of a user can be updated as the user is on the move.

The messaging system may display to a user a segment of a larger map. In some instances, the segment of the larger map that is displayed to the user can be based on the user's current location 214. The system may display the map up to a radius, length, and/or width (e.g., positive and negative directions in the x-axis and y-axis relative to the user) of a certain predetermined distance from the user's current location. For example, the messaging system may display the map up to 0.5 miles in each of the north, south, east, and west directions from the user's current location. Alternatively or in addition, the user may select a map segment to be displayed, such as by scrolling through the map and/or zooming in or out of the map. A larger segment of the map can be displayed when the user zooms out. A smaller segment of the map can be displayed when the user zooms in. In some instances, the user may manually enter an address of any specificity (e.g., street address, country name, etc.) and the messaging system may display a segment of the map containing at least a portion of the address or a segment of the map containing all boundaries of the address of the specificity. The user may select a location remote to, and/or regardless of, the user's current location.

In some instances, the map may be oriented relative to a fixed direction (e.g., a top edge of the map is always facing North). In other instances, the map may be oriented relative to a direction the computing device is pointing towards. The computing device may detect an orientation of the computing device (e.g., relative to compass directions) using one or more geo-location sensors. Such orientation of the map can be updated in real-time. In some instances, the user may alternate between a fixed direction mode and an actual orientation mode.

To create a message relating to a location, the user may pinpoint to a location of any specificity. For example, the location can be a continent, a country, a state, a city, a county, a neighborhood, a block, a street, an alley, an intersection, a toll booth, a walkway, a car lane, a path, a building, a a floor, an elevator, a stairway, a window, a door, an entranceway, a gate, a bridge, a tunnel, a zip code, a district, a zone, a region, a campus, an ocean, a river, a stream, a park, a forest, a mountain, a landmark, or any other natural or artificial boundary or object that can be isolated as a separate location. In some instances, the location can be three-dimensional, including a longitudinal and latitudinal axis as well as a height axis (e.g., different levels from the ground, sea level, etc.). The user may flexibly zoom in or zoom out of a map-based interface to focus on a specified location of any scale (e.g., zooming out from a city to select a country as a location, zooming in from the city to select a toll booth as a location).

The user providing the message can be a registered user of the messaging system. In some instances, the user providing the message can be a member of the general community with access (e.g., a member of the public via open web access) to the system. In some instances, the user providing the information, registered or unregistered, can be anonymous. If a user is a registered user of the system, the user may have a unique profile with the system. For example, the system may store profile information of the user such as name, user name, nickname, password, passcode, electronic mail (email) address, address, phone number, profile picture, account activity (e.g., history of providing a message, rating, etc.), and/or other personal or non-personal information associated with the user. In some instances, if the messaging system is integrated as part of a pre-existing social networking system, the system may synchronize the user's profile information (e.g., friend network, following network, etc.) from the existing social networking system.

In the message, the user can include any type or form of information relating or relevant to the specific location. For example, the message can be in the form of text (e.g., a string), an image, audio, video, or a combination thereof. In some cases, text can be provided via voice-to-text translation systems (e.g., software), such as via audio input. The text can be provided in the form of a string. The message may include a hyperlink (e.g., URL). In some examples, the string can have a character limit of about 1000 characters, 300 characters, 400 characters, 300 characters, 200 characters, 150 characters, 140 characters, 130 characters, 120 characters, 110 characters, 100 characters, 50 characters, 40 characters, 30 characters, 20 characters, 10 characters or more than the above. The character limit can be a function of character font size and/or whether an image or video is provided with text. In an example, the character limit can be 120 characters at size 10 font and 100 characters at size 12 font. The user may be able to change font (e.g., size, style, color, etc.) of the text.

In some cases, the message can have a maximum limit of 50 images (e.g., photographs), 40 images, 30 images, 20 images, 10 images, 5 images, 4 images, 3 images, 2 images, 1 image, or more than the above. In some cases, the message can have a maximum video length of 1 hour, 50 minutes, 40 minutes, 30 minutes, 20 minutes, 10 minutes, 5 minutes, 4 minutes, 3 minutes, 2 minutes, 1 minute, 30 seconds, 20 seconds, 10 seconds, 5 seconds, 1 second, or longer than the above. An image or video can include an annotation. In some cases, an image and/or video can include a text annotation with a maximum character limit of 1000 characters, 300 characters, 400 characters, 300 characters, 200 characters, 150 characters, 140 characters, 130 characters, 120 characters, 110 characters, 100 characters, 50 characters, 40 characters, 30 characters, 20 characters, 10 characters, or more than the above. In some cases, the message can be limited by a file size. For example, the message can have an individual or aggregate file size limit of about 100 megabytes (MB), 75 MB, 50 MB, 45 MB, 40 MB, 35 MB, 30 MB, 25 MB, 20 MB, 15 MB, 10 MB, 5 MB, 4 MB, 3 MB, 2 MB, 1 MB, 500 kilobytes (KB), 400 KB, 300 KB, 200 KB, 100 KB, or higher or lower than the above. For example, text-only messages may have a much smaller file size limit than messages containing one or more images and/or videos.

The message can comprise a title, a description, and/or a category of a specific location. For example, the title can be a name or nickname of the specific location, a name of an infrastructure on the specific location, an address of the specific location, or a title or preview for the description of the specific location (e.g., "Good place for late night pizza," "Best noodle in SoHo," "Beware of mosquitos in the park," "Well hidden café !" etc.). In some instances, the title may be provided as a text string only (without images, links, and/or videos). The title string can have its own maximum character limit, word limit, and/or line limit. Similarly, the description can have its own maximum character limit, word limit, and/or line limit. The description can be any description related to the specific location.

A category of the location can be a topic, a type, an atmosphere, a background, or any other descriptive shorthand of the location by which at least two locations can be grouped. For example, the category can describe if the atmosphere of the location is "casual," "formal," or "business." For example, the category can describe a type or atmosphere of an activity appropriate for the location, such as "sports," "theatre," or "dining." For example, the category can describe a cultural backdrop of the location (e.g., "Chinese" for Chinatown, "Italian" for Italian restraint, "Japanese" for origami store, etc.). In some instances, the system may comprise a pre-determined list of a finite number of categories from which users can select. Alternatively or in addition, a user may create a new category to associate the location with. In some instances, if a user creates a new category, the system may save the category and present the category for selection by other users.

In some cases, a specific location can be identified with 1 category, 2 categories, 3 categories, 4 categories, 5 categories, 10 categories, 20 categories, 50 categories, or more. A category can be a parent or child subset of another category. A parent category (e.g., sports) can encompass all children categories (e.g., basketball, baseball, golf, etc.). A location associated with a parent category can be associated with all the children categories of the parent category. A location associated with a child category can be associated with the parent category but not the other children categories of the parent category. A category can have any degree of broadness.

In some instances, a category can be represented by a graphic or some symbol representative of the category (e.g., football for "sports," wine glass for "dining," movie reel for "theatre," shopping bag for "shopping," silhouette of male and female for "restroom," etc.).

The user may manually select one or more categories when providing a message for a location. Alternatively or in addition, the system may automatically assign one or more categories. For example, if one or more messages have been provided for the same location or locations within a certain radius (e.g., 1 mile) of the location, the system may automatically assign one or more categories that are common to the same location or locations within the certain radius. In another example, if a description provided by the user provides certain keywords (e.g., "food" and "delicious" in "The food is delicious."), the system may automatically assign one or more categories (e.g., "restaurant," "dining," etc.) based on the keywords. In some instances, the system may recommend, instead of automatically assigning, such categories to the user for selection when the user is providing a message.

The message created by the user can be displayed on the map-based interface 204 as, and/or be represented by, a tag (e.g., tags 210, 212, 218, 220) in FIG. 2. The tag can be a label, a sticker, a marker, a sign, or any other graphic symbol that can be displayed on a graphical user interface, such as the display 202. The tag can be placed adjacent to the specific location that the message is directed to. Tags are described in further detail with FIGS. 3A and 3B. The message can be displayed in a map format, as tags, or in a list format.

All tags created by users of the system 200 can be displayed in the map-based interface 204. In some instances, a user of the system browsing a map on the map-based interface 204 may filter the tags displayed on the map, such as by message category, user rating, message author (e.g., a user of the system), message text (e.g., text in title and/or description), specific location to which message is directed to, and/or a combination of the above.

The user who authors a message may determine how a tag, representative of the authored message, is displayed (e.g., placement location and orientation) on the map-based interface 204. For example, the user may determine a precise location and/or an orientation of the tag. By virtue of the tag having an orientation definition, the tag can be placed adjacent to (and not placed on) the precise location and be oriented towards the precise location. FIG. 2 shows a plurality of tags, wherein each tag points to a specific location. In some instances, a plurality of tags can point to a same location, such as a tag 222 and a tag 224. However, instead of completely overlapping each other, each tag may be placed at a different location on the map and be configured to point towards the same location. Other users viewing that specific location on the map-based interface 204 may be quickly able to discern that there is more than one tag for the same location and avoid overlooking one tag at the expense of one or more other tags. A tag may overlap at least a portion of another tag. A tag may be displayed over any object, shape, and/or line inherent of the map. For example, a tag may be placed over a rectangular block representing a distinct building on the map. In some instances, with three-dimensional maps, a user may configure the tag's placement in up to six degrees of freedom, such as roll, pitch, yaw, and in x, y, z coordinates (or in alternative or equivalent coordinates). This can be useful when the map-based interface 204 provides a map having three-dimensional features (e.g., elevated buildings shown on two-dimensional maps, road view, etc.). In some cases, the tag can have a three-dimensional shape (e.g., having a volume).

Through the messaging system, a user may author a message relating to any specific location, or any specific part of a location, and be able to tie, for display to other users, the message to the specific location or specific part of the location. For example, a tag 210 can describe a first building 206 and a tag 212 can describe an entranceway 208 to the first building 206. In another example, a tag 218 can describe a street intersection (e.g., "Traffic signal for left turn is particularly long here," "Right turns only," "Traffic light broken," "Accident prone," "Under construction until March 2008," "Watch out for dent in road," etc.). By being able to specify a location to any degree of specificity, users may share more detailed information about a particular location, such as precise directions (e.g., which stairway to use as a shortcut) within a building, warnings or other cautionary signs, reviews, or other helpful tips relating to a location.

Figure 3A:
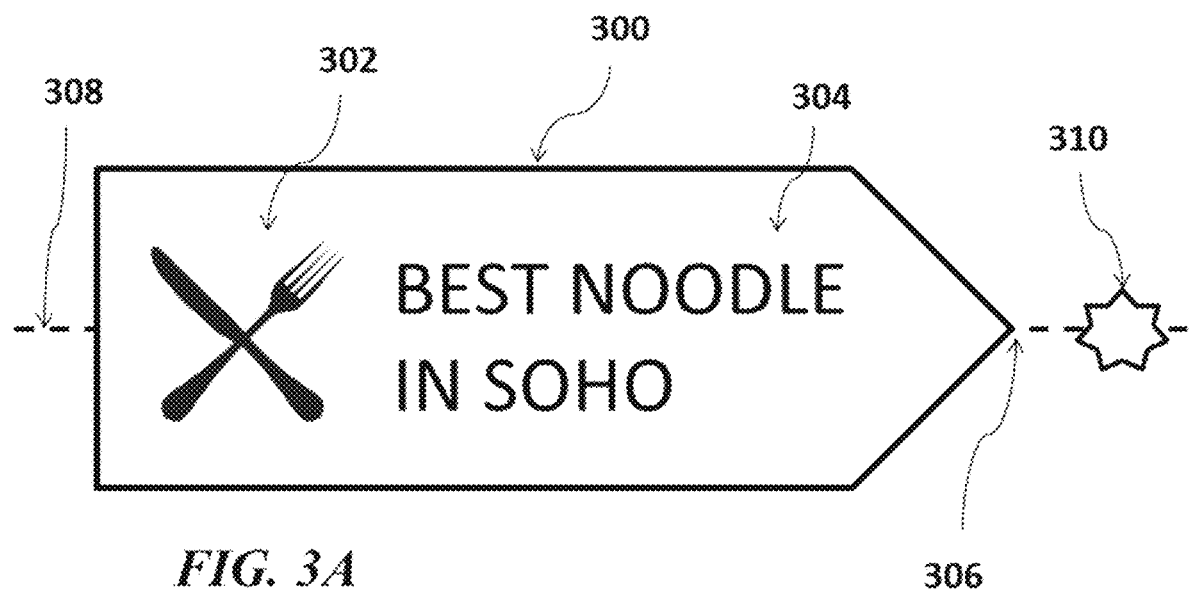
FIG. 3A shows an exemplary tag in a default state.
Figure 3B:
FIG. 3B shows an exemplary tag in an active state.

FIGS. 3A and 3B show exemplary tags of the messaging system. FIG. 3A shows a tag in a default state and FIG. 3B shows the tag in an active state. The tag 300 can comprise any color, size, and/or shape (e.g., an arrow, a polygon, a circle, an arbitrary drawing, etc.). In one example, as in the tags in FIG. 2 and FIGS. 3A and 3B, the tag can have a long pentagonal shape with an extended rectangular base. The tags described in the present disclosure are not limited to the examples disclosed in FIGS. 3A and 3B. The tag 300 can comprise an arrow-like tip 306 or other point of interest that can intuitively allow a user viewing the tag to distinguish an orientation of the tag. For example, the tag can be arrow-shaped. In other examples, the tag can comprise one or more distinguishing features (e.g., a dot or a symbol, etc.) near one edge, corner, tip, and/or boundary of the tag that can allow a user to distinguish direction. In some instances, the tag can have a longitudinal axis 308 passing through the tip 306 of the tag. When the tag is pointing towards a specific location 310 (e.g., building, street, door, window, etc.), the longitudinal axis 308 can pass through at least a portion of the specific location 310.

A tag may have a default state (such as in FIG. 3A) and an active state (such as in FIG. 3B). In the default state, the tag may display only limited information (e.g., a category symbol 302 and title 304). For example, the tag can show no content at all, and comprise just an outline of a shape of the tag. In another example, the tag may show only a title 304, only a rating of the tag, only one or more categories 302, only a user 314, only a description 312 of the message, and/or a combination of the above. In some instances, the tag may show a title, category, user, and/or a description each up to a certain maximum number of characters, words, sentences, or lines. In some instances, the tag may show only one category of the tag. In some instances, the tag may show a graphic symbol or icon representing the category 302 in the interest of saving limited space provided by the tag and/or for more simplified viewing for users of the system. In some instances, the tag can be color-coded to represent different categories (e.g., green for "restaurants," blue for "shopping," etc.). In some instances, the tag can comprise different shapes to represent different categories. All tags displayed on the map-based interface can be displayed to have a uniform size. Alternatively, the tags displayed on the map-based interface can be displayed to have different sizes.

When a tag does not display all content of the message, one or more actions can be performed by users wishing to view more content (e.g., clicking, double-clicking, triple-clicking, tapping, sliding, zooming in or out on the tag, etc.). User commands are discussed in more detail further below. When an additional action is performed, the tag may alternate to the active state and display the entire message or the rest of the content not shown in the default state.

In an example, a first user 314 of the messaging system provides to the messaging system a review message for a ramen restaurant located at a specific location 310. The first user provides a title 304 of "BEST NOODLE IN SOHO," a category 302 of "dining," a user name 314 of "User X," and a text description 312 reading, "Here is the best place in the city for noodles. Don't let the rude waiters scare you!" A tag 300 is created by the messaging system to represent the first user's review message. The first user places the tag 300 on a map, via a map-based interface (e.g., map-based interface 204 in FIG. 2), such that the tag 300 is adjacent to the specific location 310. The first user may locate the specific location 310 on the map relative to a current location of the first user (e.g., current location 214 in FIG. 2) that is displayed by the messaging system and/or by inputting an address of the specific location 310 to the messaging system. The first user may rotate the tag 300 on the map such that the tag 300 is pointing towards the specific location 310, such as by pointing a tip 306 of the tag 300 towards the specific location 310. The messaging system can secure the position and/or orientation of the tag 300 by the first user. The tag 300 can thereby be displayed on the map-based interface for viewing by other users of the system.

Once the tag 300 is placed on the map, in a default state, the tag 300 displays only the dining category 302 as a symbol and the title 304 of "BEST NOODLE IN SOHO." A second user of the system, for example browsing through a segment of a map containing the specific location 310, can see the tag 300 adjacent to the specific location 310 and pointing to the specific location 310. Interested by such category and/or title that is displayed on the tag 300, the second user can perform an additional action on the tag (e.g., clicking on the tag) to gain access to the rest of the content. When the second user performs the action, the tag can alternate to an active state and show the full message, or a more detailed message, of the first user's review, such as the accompanying description 312 of "Here is the best place in the city for noodles. Don't let the rude waiters scare you!" and an authoring user 314 of the message. The tag in the active state can comprise further links or buttons that can direct the second user to a hyperlink 318, and/or one or more pictures 316 that are part of the message of the tag 300. In some instances, in the active state, the tag can be enlarged (as in FIG. 3B) to display all content of the message, such as the title, all categories, user-creator, full description, rating, pictures, audio, video, hyperlinks, and/or links thereto. In some instances, in the active state, the tag can be flipped to show a back side containing other content. In some instances, in the active state, a new object (e.g., text box, tag, pop-up, etc.) can be created temporarily to display the message. In some instances, in the active state, a new page can be created to display the message. Alternatively, a combination of the above can occur. Once the second user has finished reading the tag, the second user can perform another action (which can be the same or different action as above) to return the tag 300 to the default state.

In some instances, the second user and/or other users of the system can rate the first user's tag. An aggregate rating (e.g., average or mean of all ratings, etc.) of the tag may also be displayed on the tag in the default state and/or the active state of the tag.

In some instances, only certain users may provide ratings. For example, only users who have physically visited the specific location that a tag is describing may be able to provide a rating for the tag. Whether a user has physically visited the specific location can be confirmed via one or more geolocation sensors that can detect the user's current location. In some instances, only users who have viewed the whole content of a message (e.g., active state of a tag of the message) may provide ratings for the tag. In some instances, only certain users that the authoring user of a tag has given permission to may provide ratings for the tag. In some instances, any user may provide ratings for a tag. In some instances, only registered users of the system may provide ratings for a tag.

The rating provided by a user can be a quantitative or qualitative input to the system. For example, the user rating can be numerical or non-numerical. In an example, the rating can be a score out of a maximum number (e.g., 5, 10, 100, etc.). In another example, the rating can be an arbitrary score without a floor and/or a ceiling. In some instances, the rating can be selected from a discrete scale (e.g., with increments of 0.01, 0.1, 0.5, 1, 5, 10, etc.) or a continuous scale. For instance, a user may rate a tag in the form of a number of stars, with one of 11 options ranging from a lowest 0 stars to a highest 5 points in 0.5 increments. Alternative to numerical input, a user may input a rating in the form of, for example, colors, words, letters, graphics, sound (e.g., frequency, wavelength, or note), or as a combination of the above, among other non-numerical forms. For example, the system may provide as possible rating options a continuous or discrete gradation of options (e.g., color, frequency of sound, alphabet letters, etc.) from one endpoint to a second endpoint. Alternatively, the system may provide as possible rating options a gradation of options from within a grid having two axes or three axes.

The system may combine individual ratings received for a tag to determine an aggregate rating for the tag. In some instances, the aggregate rating can be a numerical score. For example, the aggregate rating can be an average, a mean, and/or a median of the individual ratings. In another example, the aggregate rating can be a total sum of all individual ratings. In another example, the system may assign different weights to different ratings (e.g., a rating provided by an active user is given more weight than a rating provided by user with no activity, etc.) before finding a total, average, or mean. The aggregate rating can be based on other statistical determinations (e.g., maximum rating, minimum rating, average of highest 30% of ratings, etc.) of the individual ratings.

The system may store rating information for each tag. Based on the ratings of one or more tags, or user performance, a user can be awarded a special status. For example, the system can award a special status (e.g., achievement) to: a user who has received a first five star rating for a tag, a user who has received a first five star rating for a tag in a certain category, a user who has received high ratings in at least a certain number of tags, a user who has a high average aggregate rating for all tags created by the user, a user who has created at least a certain number of tags (e.g., 10, 20, 30, 40, 50, 100, 150, 200, or more), a user who has made at least a certain number of social connections (e.g., following, followers, friends, etc.) in the networking system, and/or a user who has authored at least a certain number of tags in a geographic area, among other achievements that a user can make. One or more special statuses can be noted on a user's profile page. In some instances, such special statuses can be noted on all tags that the user authors, such as by changing the font, color, and/or size of the username or adding a special symbol next to a username to distinguish the user from other users.

A user may report a tag, such as when a tag is inappropriate (e.g., unrelated to the location, containing inappropriate content, advertisements, incorrect content, etc.). The system may alert the authoring user. In some instances, the system may automatically remove a tag from display in the system interface (e.g., map-based interface, list format interface) when the tag is reported as inappropriate by at least a certain number of users.

Figure 3C:
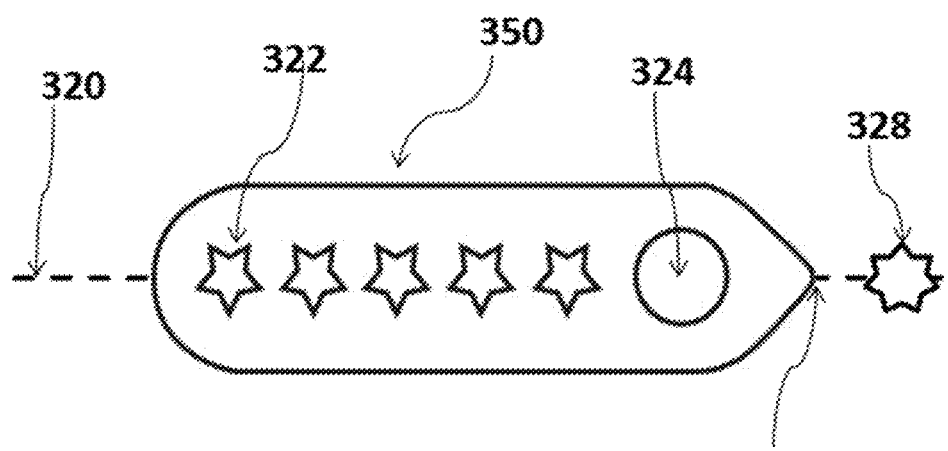
FIG. 3C shows an exemplary tag of the messaging system displaying a rating of the tag.

FIG. 3C shows an exemplary tag of the messaging system displaying a rating of the tag. The tag 350 can comprise any color, size, and/or shape (e.g., an arrow, a polygon, a circle, an arbitrary drawing, etc.). In one example, as in the tag 350 in FIG. 3C, the tag can have a long pentagonal shape with an extended round base. The tag 350 can comprise an arrow-like tip 326 to allow a user to distinguish direction. In some instances, the tag can have a longitudinal axis 320 passing through the tip 326 of the tag. When the tag is pointing towards a specific location 328, the longitudinal axis 320 can pass through at least a portion of the specific location 328. The tag 350, in a default state, can display limited information, such as only a rating 322 of the tag and a category 324 of the tag. In some instances, the displayed rating 322 can be an aggregate rating of the tag. In other instances, the displayed rating can be the last rating of the tag by a user in the system. In other instances, the displayed rating can be the rating given by a user that the tag is being displayed to. A user wishing to view the full message may perform an action (e.g., clicking, tapping, etc.) on the tag.

In some cases, the tag can change color, size, and/or shape depending on the rating 322. For example, a tag with a five star rating can have a longer shape than a tag with a two star rating. In some cases, the tag can change color, size, and/or shape depending on the category 324. For example, a tag with a dining category can have a green color and a tag with a shopping category can have a blue color. By changing the appearance of the tag, a user browsing through a map-based interface may conveniently sort through a plurality of tags.

Figure 3D:
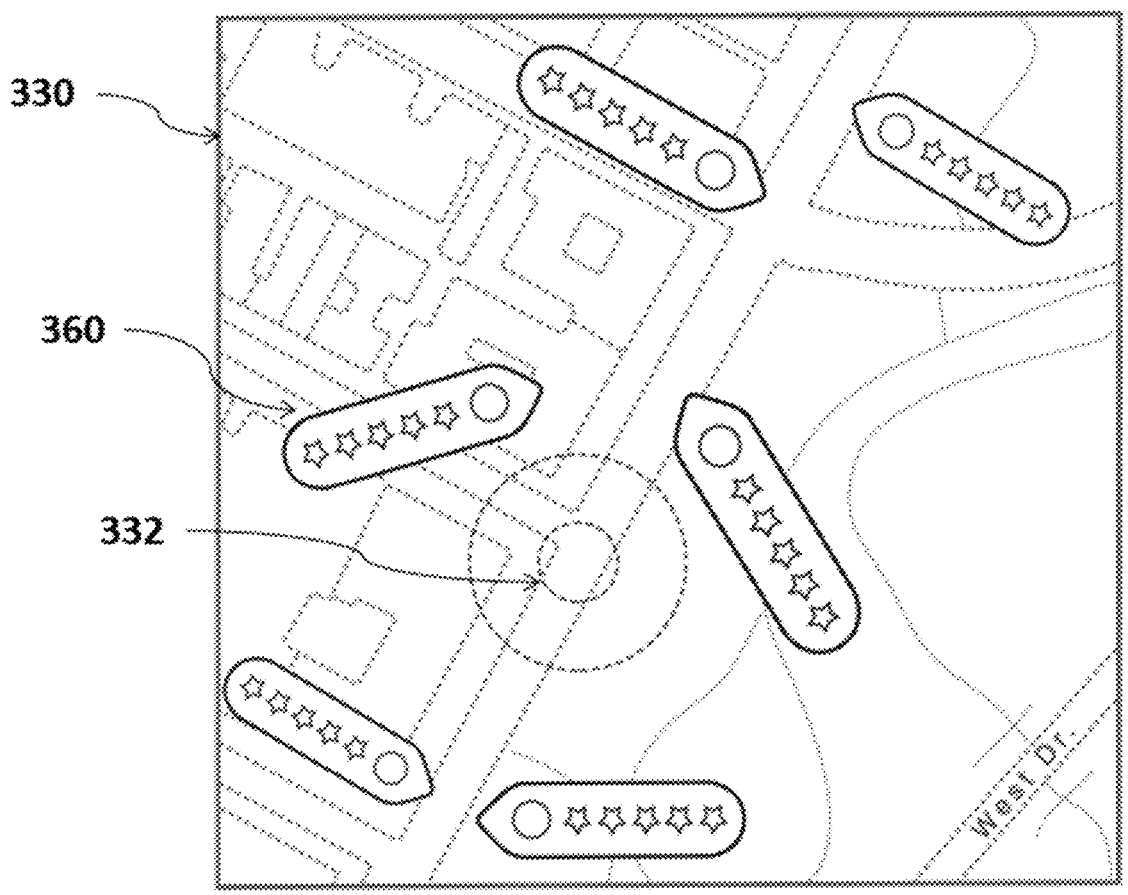
FIG. 3D shows an exemplary map-based interface of a messaging system displaying a plurality of tags.

FIG. 3D shows an exemplary map-based interface of a messaging system displaying a plurality of tags. A plurality of tags 360 (such as the tag 350 in FIG. 3C) can be placed on a map-based interface 330 for display to a user of the messaging system. The map-based interface 330 may also display the user's current location 332. Each of the plurality of tags 360 can point to a specific location for which the respective message in each tag is directed to.

In some instances, only the user who authored a tag can edit the tag. In some instances, the user authoring a tag can grant permission to other users to edit the tag. For example, if a first user authors a tag, the first user can grant any user in the system permission to edit the tag, only users who are connected (e.g., friends, following, followed, etc.) to the first user in an integrated social networking system permission to edit the tag, and/or only specific users individually selected by the first user permission to edit the tag. In some instances, a supervising user, managing user, parenting user, or other superior user of the first user can grant permission to other users to edit the tag. For example, if a first user is part of a larger organization or a group of users (e.g., employer), all users who are also part of the larger organization or the larger group may be able to edit any tag that the first user has authored. In some instances, the first user may grant limited editing permissions to a group of users, such that the group of users can only edit certain portions of the tags, such as just the title, just the category or categories, just the description, just the location that the tag is pointing to, just the placement configuration of the tag, and/or a combination of the above. In some instances, only the user who authored a tag can delete the tag. Similar to editing permissions, deleting permissions can also be selectively or generally granted by the authoring user or in an organizational context.

A tag can have an expiration date or time. For example, a tag can automatically delete from the system on the expiration date or time. A user creating the tag may set any future date and time as the expiration date or time. In some instances, the system may send the user a notification or warning before the tag is deleted.

In some instances, a second user may choose to connect to a first user in the messaging system. A connection may include becoming friends, becoming contacts, following an activity of the user (e.g., in a feed), and/or other methods of connecting within a social networking system. Ties between any two users can be stored in a memory or database (e.g., database 404 in FIG. 4) of the messaging system.

The messaging system may comprise social networking functionalities, such as allowing any one user to connect with another user and building a network of ties between users of the system. Users may be provided with other social networking functions such as forming open or closed groups, sharing profiles, messaging options (e.g., both delayed and instant messaging), commenting, feedback (e.g., rating), updating feeds between connected users, profile pages, profile pictures, various contact lists (e.g., following list, followed list, friend list, mutual friend list, etc.) and other social networking functions. Users may freely join open groups. Users may join closed groups by invitation only. In some instances, a user's activities in the messaging system may be synchronized with the user's activities in other social networking systems such that posting an activity in one forum (e.g., creating a tag in the messaging system) automatically or selectively reposts the activity in another forum (e.g., reposting on Facebook®, Twitter®, Instagram®, etc.). A user may share (e.g., via posting or reposting) a tag across different social networking systems.

The connection between two users can be mutual or non-mutual. In some cases, before a connection is made, both users must agree or otherwise give permission to the connection (e.g., becoming friends). In some cases, a connection can be made without a user's permission, such as when a second user follows a first user. Once the second user is following the first user, the second user may be provided a feed of updates on activities by the first user (and any other user that the second user is following). The second user may also gain access to a list of all tags that the first user has created.

In some instance, connected users may share tags. Connected users may share locations and/or emergency alerts. In some instances, a user may share emergency alerts with non-connected and/or non-registered users. The system may transmit the emergency alerts to non-registered users via email, SMS text, phone call, or any external communication system. For example, a first user can pre-select one or more contacts to alert when the first user is in an emergency. The first user may press an emergency button (or other user command) to share the first user's location to the pre-selected contacts in emergency situations.

In some instances, a user may follow a geographic area. The geographic area can have any degree of specificity, such as those described above (e.g., continent, country, city, zip code, county, street, etc.). A user following a geographic area may get updates for new tags or updated tags created in that area.

A tag may be a public tag or a private tag. Public tags may be displayed to all users of the messaging system. Private tags may be displayed to the creating user and only to specific users that the authoring user grants permission to. For example, individuals working for one employer may each register as users in the messaging system and form a group. The users, acting in the capacity of employees, may create private tags to be displayed only to fellow employees of the employer (e.g., members of the group). In the same manner, the users may also choose to grant tag editing permissions to only fellow employees. This may be particularly useful for employees whose scope of employment includes navigating a map (e.g., delivery services, traveling services, touring services, driving services, etc.). Any two users may share private tags.

The system may provide a first user with an analytical report on tag usage. The report can be for a specific time period (e.g., first week of January). Alternatively, the report can be for an account life of the first user. For example, the report can include information about tags the first user created, information about tags created by users who the first user is following, and/or information about tags that the first user has rated. The information can include statistics such as number of tags created, number of users rating the tag, number of times the tag was shared, average aggregate rating over a time period, average aggregate rating overall, date or time a tag was created, frequency of tag creation, frequency of tag editing, and other analytics.

The tags can be displayed in a map format (as in FIG. 2) in the map-based interface. Alternatively, the tags can be displayed in one or more lists in a list format. A user may flexibly alternate between the map format and the list format. Additionally, users may filter the tags to be displayed.

In a list format, a user may be presented with a list of tags relating to locations within a certain radius, width and/or length of a reference location. The reference location can be the user's current location. Alternatively, the reference location can be manually input by the user to any location adjacent to or remote from the user. In some instances, if a user is alternating to a list mode from a map mode, the user can be presented with all the tags within the displayed segment in the map mode. The list format may display a list of tags, each tag represented by a unit block. The unit blocks can be arranged in rows vertically or in columns horizontally. In some instances, the unit block can have the same shape as the shape of the tags (e.g., pentagonal) displayed in the map format. Each unit block may have a default state and an active state, similar to the tags displayed in the map format (as in FIGS. 3A and 3B). For example, the default state and active state of the unit block of a tag in a list format can display the same information scope as the default state and active state of the tag displayed in a map format. In the default state, the unit block may display limited information, such as only the title, only one or more categories, only a user name, only a location address, only a description, only a rating, and/or a combination of the above. In some instances, the system may determine a distance from the user's current location to the location relating to the tag (e.g., "0.1 miles from user") and display the distance for reference.

A user may perform an action (e.g., clicking) on the unit block of the tag to view detailed information of the tag. The detailed information may appear as a new page, a new object (e.g., pop-up, etc.), or an enlargement or other manipulation or transition of the unit block. In some instances, performing the action on a unit block of the tag in the list format may bring up an active state of the tag in the map format.

The user may filter and/or search the tags displayed by the system, whether the tags are displayed in a list format or a map format. For example, the user may filter by private tags or public tags. The user may filter further within private tags, such as to display private tags associated with only certain users. Alternatively or in addition, the user may filter displayed tags by an authoring user, an aggregate rating of the tag (e.g., at least 3.5 stars or above, etc.), one or more categories of the tag, text in a title and/or description of the tag, a date the tag was created, a date the tag was last edited, a date the tag was last rated, a last rating of the tag, a number of users that rated the tag, a number of times the full message in the tag was viewed, a total number of tags created by the authoring user, one or more special achievement statuses of the authoring user, other properties of the tag (e.g., metadata, content, etc.), and/or other properties of the authoring user. Additionally, the user may filter the tags by a location of any degree of specificity. In some instances, a user may create custom tag filter definitions.

In some instances, a user may filter and/or search the tags displayed by the system by an open or closed group in the messaging system. For example, the user may filter by a group if the user is a member of the group. When filtered by group, the system may only display tags created by other members in the group, tags rated by other members in the group, tags created by users that are followed by at least one member in the group, and/or other subsets of tags that can be filtered by group definitions. In some instances, the group can be associated with one or more categories, and when filtered by group, the system may only display tags associated with at least one of the categories associated with the group.

The messaging system may comprise map-based functionalities, such as providing a map-based interface. The map-based interface can be interactive. The system may provide users with direction functions to guide a user to find directions between a user's current location and a tag, between any two tags, between any two locations, and/or between any location and a tag. In some instances, the direction function can also provide detailed directions (e.g., street by street), an estimated time of arrival, alternate routes to select, traffic condition in the provided routes, estimated costs of travel, and/or alternate transportation methods (e.g., walking, driving, public transportation, bicycle, Uber®, etc.).

In some instances, the system may display to a first user, on the map-based interface, the respective current locations of other users of the system. For example, a plurality of users can form a first group in the messaging system and view the current locations of all members of the first group on the map-based interface. The system may request permission from each of the other users of the system to display their location.

Users may be able to input various user commands via the map-based interface and/or other interfaces (e.g., list format interface) of the system. The user command can comprise actions such as tapping, clicking, double-clicking, triple-clicking, pressing, sliding, drawing, scrolling, touching, flicking, shaking, dragging, pinching, a combination in a sequential order of one or more actions above and/or other actions a user may perform with a user interactive device. Some specific examples are provided, which in most cases can be performed by touch or via a mouse. For example, when a user is browsing the map-based interface, the user can press (or click) and drag a section of the map (that is not also a tag) to explore regions beyond the boundaries of what is shown. For example, when a user is placing a tag on the map-based interface, the user may press (or click) and drag a graphic (or icon) of the tag on the map-based interface. When a user is orienting the tag, the user may press (or click) and drag a point of rotation. For example, when a user wants to zoom in on a tag, the user can touch (or click) the tag. The tag can enlarge or zoom in in the default state upon the motion command. Alternatively, the user can touch (or click) and hold for a certain time period to give the command. When a user wants to alternate a tag from a default state to the active state, the user can double tap (or double-click) on the tag. When the user wants to return from the active state to the default state, the user can swipe the tag. When the user wants to zoom out from an enlarged default state, the user may triple tap (or triple-click) on the tag. Other actions or combinations of actions can be performed, via touch, a stylus, a pointing device (e.g., mouse) or other user interactive device to achieve the same commands.

In some instances, the system may have different types of user accounts. For example, a first type of user account can be opened by users free of charge, and a second type of user account can be opened at cost or otherwise on a subscription fee basis. The system may provide the second type of user account with more functionalities than the first type of user account. For example, only the second type of user account may be able to create private tags, allow multiple users (including non-authoring users) to create, edit or remove tags, receive custom reports of tag usage, create custom tag filter definitions, create tags with expiration dates and times, have a secure log in or registration process, and/or view current locations of other users in the system. In some instances, the system may have more than two different types of user accounts, wherein each type of user account comprises a different subset of the functionalities of the messaging system described above and further below.

Figure 4:
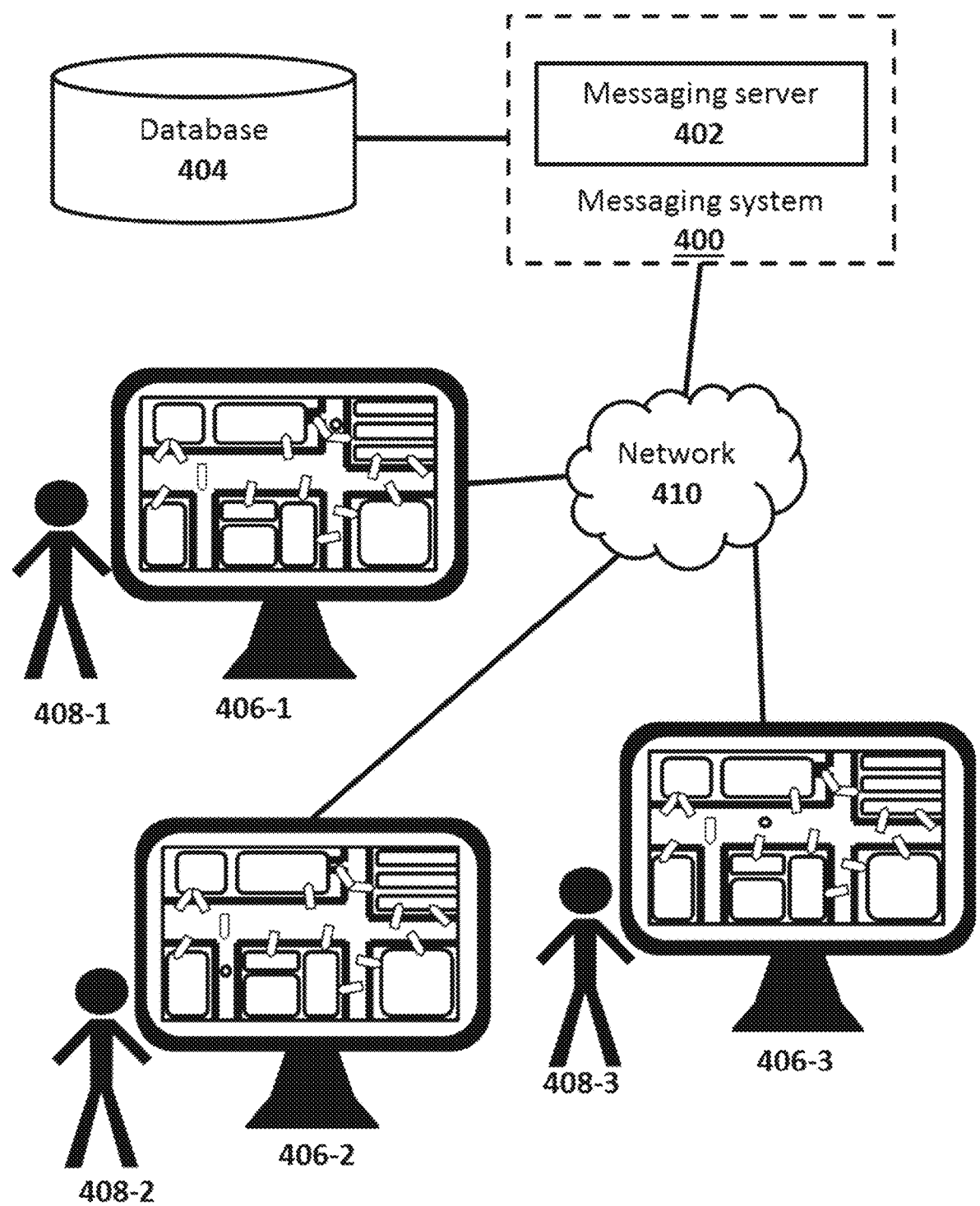
FIG. 4 shows an exemplary network comprising one or more messaging systems.

FIG. 4 shows an exemplary network comprising one or more messaging systems, in accordance with some embodiments. The network layout may include a plurality of user devices 406 accessible by a plurality of users 408, a network 410, a database 404, a messaging server 402, and a messaging system 400. While only a limited number (e.g., 1, 2, 3, etc.) of each component is shown in FIG. 4, the acting components of the network are not limited to what is shown. For example, the network may include a plurality of messaging servers. Each of the plurality of messaging servers may be the same as the messaging server 402. For example, the network may include a plurality of messaging systems. Each of the plurality of messaging systems may be the same as the messaging system 400. Each of the components 400, 402, 404, and 406 may be operatively connected to one another via a network 410 or any other type of communication link that allows the transmission of data from one component to another. In some instances, the network 410 can integrate one or more networks of one or more pre-existing social networking systems and/or comprise an independent social network of the messaging system 400.

The network layout may comprise a plurality of nodes. Each of the plurality of user devices 406 in the network may correspond to a node. Each of the plurality of users 408 in the network may correspond to a node. In FIG. 4, if a "user device 406" or a "user 408" is followed by a number or a letter, it means that the "user device 406" or the "user 408" may correspond to a node sharing the same number or letter and other components corresponding to the node. For example, as shown in FIG. 4, a user device 406-1 may correspond to node 1 which is associated with user 408-1, a user device 406-2 may correspond to node 2 which is associated with user 408-2, and so on. A node may be a logically independent entity in the network layout. Therefore, the plurality of nodes in the network layout can represent different entities. For example, each node may be associated with a user, a group of users, or groups of users. For example, a node may correspond to an individual entity (e.g., an individual). In another example, a node may correspond to multiple entities (e.g., a group of individuals).

The network 410 may comprise a plurality of user devices 406 to aid a plurality of users 408 gain access to one or more services (e.g., map-based interface, etc.) provided by the messaging system 400. The network may comprise more than three user devices (e.g., as shown in FIG. 4). Any user device may be the same as a user device 406-1, user device 406-2, and/or a user device 406-3. Each user device may have simultaneous access to the messaging system. Each user device may be located in the same or different geographical locations. Each user, with aid of a user device, may independently interface with the messaging system. For example, if there are three users simultaneously using the messaging system, each of the three users may customize the user experience and be looking at a different segment of a map in the map-based interface provided by the messaging system. In some instances, a plurality of users, such as users who are members of one organization, may share a same or similar user experience (e.g., seeing the same segment of a map, seeing the same sample of filtered tags, etc.).

A given user device of the plurality of user devices 406 may be configured to receive user input, such as through one or more user interactive devices described previously (e.g., keyboard, mouse, touchscreen, etc.). The user input can comprise user commands or other user information that is transmitted to the messaging server 402. The input may include a user performing various virtual actions. The input may include, for example, providing content for a message, selecting a location to browse on the map-based interface, editing, deleting, or rating a tag, and/or selecting another user to connect with.

A user device can be a computing device as described previously herein. The computing device can be configured to perform one or more operations consistent with the disclosed embodiments. For example, the user device may be a computing device that is capable of executing software or applications provided by the messaging system 400. In some embodiments, the software and/or applications may enable the user to detect a location, create, edit, or delete tag content, place and orient tags on a map, interact with map-based interfaces, rate tags of other users, and/or perform other social networking functions or map-based functions through the messaging system. The software and/or application may have been registered with the messaging system by the user. In some instances, the user may provide authentication and/or certification of the user's identity (e.g., logging in via user name and password) before using the software and/or application. A user of the system may gain access to one or more services (e.g., access to map-based interface, ability to create or rate tags, etc.) provided by the messaging system through registration and/or authentication of the user. Alternatively, a user may gain access to one or more services without registration with the messaging system. In some instances, unregistered users may only have access to limited services (e.g., read only).

In some embodiments, the software and/or applications of the messaging system may be configured to collect data (e.g., user information, tag content, tag feedback or rating, location information) from a given user device of the plurality of user devices 406, and send them to the messaging server 402 during a user's session with the messaging system. In some cases, some or all data can be encrypted before transfer, such as to protect personal information. As described previously, a given user device may comprise one or more geolocation sensors and/or locating software. The sensors and/or the locating software can be configured to be able to detect a user's current location. The user's current location data can be sent to the messaging server 402 via the network 410.

The map-based interface may be hosted by the messaging server 402 on one or more interactive webpages and/or software applications (e.g., mobile applications, computer programs), and accessed by one or more users of the plurality of users 408.

In the illustration of FIG. 4, two-way data transfer capability may be provided between any two components, including the messaging server 402 and a given user device of the plurality of user devices 406, the messaging server 402 and the database 404, the database 404 and a given user device of the plurality of user devices 406, a given user device of the plurality of user devices 406 and the network 410, the messaging server and the network 410, etc.

The messaging server 402 may comprise one or more server computers configured to perform one or more operations consistent with disclosed embodiments. In one aspect, a messaging server may be implemented as a single computer through which a given user device of the plurality of user devices 406 is able to communicate with other components (e.g., other user devices, social networks, database 404 etc.) of the network 410. In some instances, a user device may communicate with the messaging server through the network. In other instances, through the network 410, the messaging server may communicate on behalf of the user device with the messaging system 400, other systems communicating with the network 410, and/or the database 404. In one aspect, the messaging server may embody the functionality of one or more messaging systems. In another aspect, the one or more messaging systems may be implemented inside and/or outside of the messaging server. For example, the one or more messaging systems may comprise software and/or hardware components included with the messaging server or remote from the messaging server. The messaging server may also be a server in a data network (e.g., a cloud computing network).

The network 410 may be configured to provide communication between various components of the network layout depicted in FIG. 4. The network 410 may comprise one or more networks that connect devices and/or components in the network layout to allow communication between the devices and/or components. For example, the network may be implemented as the Internet, a wireless network, a wired network, a local area network (LAN), a Wide Area Network (WANs), Bluetooth, Near Field Communication (NFC), or any other type of network that provides communications between one or more components of the network layout. In some embodiments, the network may be implemented using cell and/or pager networks, satellite, licensed radio, or a combination of licensed and unlicensed radio. The network in some cases is a telecommunication and/or data network. The network can include one or more computer servers, which can enable distributed computing, such as cloud computing. The network, in some cases, with aid of the messaging system 400 and/or the messaging server 402, can implement a peer-to-peer network, which may enable devices (e.g., the plurality of user devices 406) coupled to the messaging system to behave as a client or a server.

In some instances, the messaging server 402 can be integrated in another system, such as a social networking system (e.g., Google+®, Twitter®, Instagram®, Facebook®, Yahoo®) that each of the plurality of user devices 406 can access via the network 410. A social networking system may integrate the messaging system and/or one or more functionalities (e.g., map-based interface) of the messaging system via an API. In some instances, the messaging server 402 can, over the network, synchronize with the respective servers of the other social networking systems. Synchronization can include, for example, an import or export of a social network contact list or social networking activity or social networking account history. The network can be the Internet, an internet and/or extranet, or an intranet and/or extranet that is in communication with the Internet. A number of different computer-implemented systems, including one or more messaging systems 400 and one or more social networking systems, may communicate with each of the plurality of user devices 406 via the network. In some instances, a given user device of the plurality of user devices 406 may be directly connected to the messaging server 402 through a separate link (not shown in FIG. 4). In certain instances, the messaging server may be configured to operate as a front-end device configured to provide access to one or more messaging systems 400 consistent with certain disclosed embodiments.

The messaging server can utilize the database 404 to process and store data (e.g., tag content, current location of a user) provided by a given user device of the plurality of user devices 406. Alternatively, the messaging server can utilize a plurality of databases connected to the network 410. Each database of the plurality of databases can be The messaging server can, for example, compile the data and present at least a portion of the data (e.g., tag content, current location of a user, tag ratings) to user devices through the map-based interface.

The database 404 may be one or more memory devices configured to store data. Additionally, the databases may also, in some embodiments, be implemented as a computer system with a storage device. In one aspect, the database may be used by components of the network layout to perform one or more operations consistent with the disclosed embodiments. In certain embodiments, the database may be co-located with the messaging server 402, co-located with a given user device of the plurality of user devices 406, and/or co-located with another database on the network 410. One of ordinary skill will recognize that the disclosed embodiments are not limited to the configuration and/or arrangement of the one or more databases.

The messaging server 402 may be configured to store message content data for tags, rating information data for tags, user information data for users, and/or location information data for user devices in the database 404. In some instances, data stored in the database 404 can be indexed for search and retrieval by the messaging server 402.

Message content data can comprise a title of the message, one or more categories of the message, description of the message, user authoring the message, location of a tag (e.g., x and y coordinates, latitude and longitudinal coordinates, a point on a map, etc.), orientation of a tag, and/or other graphic characteristics of a tag (e.g., color, shape, size, etc.).

Rating information data for a tag can comprise ratings received from individual users as well as an aggregate rating determined by the messaging server 402. In some instances, the database 404 may store which user provided which rating. In other instances, the database 404 may store just the rating, for example as a purely numerical component.

User information data for a user can comprise personal and non-person user information. For example, the information can include user information requested for user registration such as a username, name, email address, phone number, password, and/or password security question and answer. User information data can also include social networking data of the user, including the user's social networking contacts (e.g., friend list, following list, etc.) from one or more social networking systems that are in communication with the messaging system, and/or social networking activity. For instance, the user's social networking contacts can be for contacts made within the messaging system. User information data can also include a user's activities in the messaging system, including a history of rating tags, a history of tags created by the user, a history of ratings received for tags created by the user, connected users in the messaging system, and other account activity history.

Location information data for user devices can include a current location of the user device and/or a history of locations visited by the user device.

In some or all cases, the user may be prompted to grant permission to the messaging server 402 to provide such information to the messaging system 400. In some instances, data received by the messaging server may be used for a particular service (e.g., displaying current location) and discarded (e.g., erased from memory) from the system instead of being stored, especially for personal and/or time-sensitive information.

The messaging system 400 may be implemented as one or more computers storing instructions that, when executed by one or more processors, can process data received from a plurality of user devices and present at least a portion of the data in a map-based interface. The messaging system 400 and the messaging server 402 can share the same or different computer systems. In certain configurations, the messaging system may be a software stored in memory accessible by the messaging server (e.g., in a memory local to the server or remote memory accessible over a communication link, such as the network 410). Thus, in certain aspects, the messaging system may be implemented as one or more computers, as software stored on a memory device accessible by the server, or a combination thereof. A variety of algorithms may be performed by one or more applications or software to execute one or more processes of the messaging server and/or the messaging system.

A computer system of the messaging system 400 includes a central processing unit (CPU, also "processor" and "computer processor" herein), which can be a single core or multi core processor, or a plurality of processors for parallel processing. The computer system also includes memory or memory location (e.g., random-access memory, read-only memory, flash memory), electronic storage unit (e.g., hard disk), communication interface (e.g., network adapter) for communicating with one or more other systems through the network 410 or other networks, and peripheral devices, such as cache, other memory, data storage and/or electronic display adapters. The memory, storage unit, interface and peripheral devices are in communication with the CPU through a communication bus (solid lines), such as a motherboard. The storage unit can be a data storage unit (or data repository) for storing data. In some instances, all data can be stored in the database 404.

The CPU can execute a sequence of machine-readable instructions, which can be embodied in a program or software. The instructions may be stored in a memory location, such as the memory of the messaging system 400 and/or the database 404. The instructions can be directed to the CPU, which can subsequently program or otherwise configure the CPU to implement methods of the present disclosure. The machine executable or machine readable instructions (or code) can be provided in the form of software. During use, the code can be executed by the CPU. Examples of operations performed by the CPU can include fetch, decode, execute, and writeback. The CPU can be part of a circuit, such as an integrated circuit. One or more other components of the system can be included in the circuit. In some cases, the circuit is an application specific integrated circuit (ASIC).

The code can be pre-compiled and configured for use with a machine having a processor adapted to execute the code, or can be compiled during runtime. The code can be supplied in a programming language that can be selected to enable the code to execute in a pre-compiled or as-compiled fashion. Aspects of the systems and methods provided herein, such as the computer system, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming.

All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Methods and systems of the present disclosure can be implemented by way of one or more algorithms. The algorithm can, for example, enable the various social networking capabilities, map-based functionalities, and the graphic user interface (e.g., map-based interface) of the messaging system 400.

While the network 410 is shown in FIG. 4 as a "central" point for communications between components of the network layout, the disclosed embodiments are not limited thereto. For example, one or more components of the network layout may be interconnected in a variety of ways, and may in some embodiments be directly connected to, co-located with, or remote from one another, as one of ordinary skill will appreciate. Additionally, while some disclosed embodiments may be implemented on the server, the disclosed embodiments are not so limited. For instance, in some embodiments, other devices (such as one or more user devices) may be configured to perform one or more of the processes and functionalities consistent with the disclosed embodiments, including embodiments described with respect to the messaging server and the messaging system. Although particular computing devices are illustrated and networks described, it is to be appreciated and understood that other computing devices and networks can be utilized without departing from the spirit and scope of the embodiments described herein.

Figure 5:
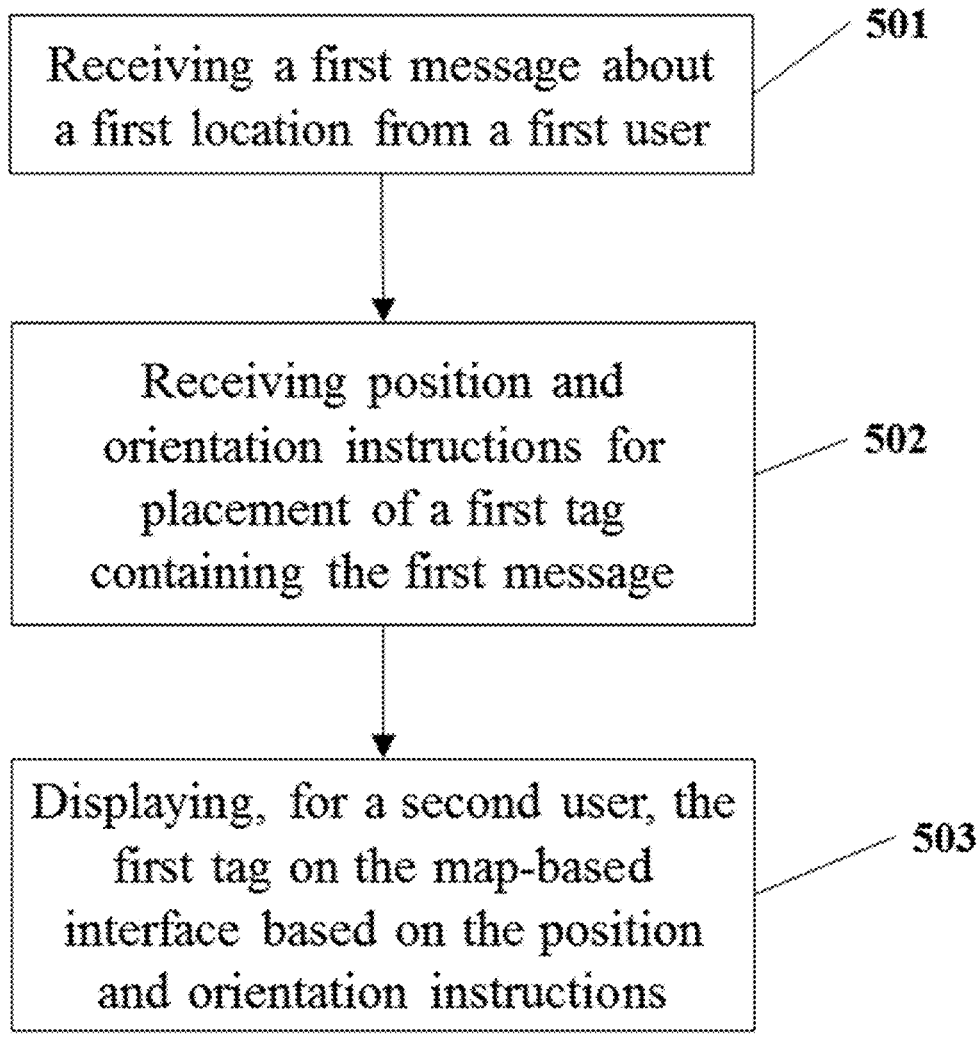
FIG. 5 shows a method for sharing messages about a specific location.

FIG. 5 shows a method for sharing messages about a specific location. The method can comprise, at a first step 501, receiving a first message about a first location from a first user. The messaging system may generate a first tag containing the first message. The first tag may display only some of the content of the first message, such as just a title and a category of the first message. Next 502, the first user can provide position and orientation instructions for placement of the first tag on a map-based interface. In some instances, the first user may place the first tag adjacent to the first location. The first user may locate the first location on the map-based interface relative to the first user's current location or by inputting an address of the first location to the system. From whatever position the first tag is placed relative to the first location, the first tag can be configured to point in a direction of the first location. Next 503, based on the position and orientation instructions from the first user, the system may display the first tag on the map-based interface. A second user or any other user of the system may be able to see the first tag on the map-based interface. The second user may perform additional actions (e.g., clicking, touching, etc.) on the first tag to see the rest of the first message.

Examples

In an example, Monica is a freshman college student who has recently moved to a new neighborhood, Manhattan. Monica is originally from a suburb in Arizona and is entirely unfamiliar with Manhattan. Monica registers as a user of the messaging system and sets up an emergency alert (in SMS message form) to go out to her mom, her aunt who lives in Connecticut, and the college campus security for when she is in emergency situations. Monica steps out of her dorm onto St. Marks Place and opens up the map-based interface of the messaging system on her mobile phone. Monica sees her current location in the middle of a three block circle and all tags in the area. Monica follows her college (e.g., New York University (NYU)) in the messaging system and selects the NYU filter. The map-based interface now only displays tags created by the office of student affairs at NYU, including grocery stores, entrances to buildings and hours they are open, subway entrances, and areas to avoid at night. Monica removes the NYU filter and selects a restaurant filter. She notices a plurality of tags carrying positive ratings and/or positive content for breakfast in a basement spot on $7^{th}$ Street. She heads to the location of the tag with the best review, and finds the entrance that she otherwise may have missed had the tag not pointed her in that direction. She enjoys the breakfast and follows the users who recommended the breakfast place (e.g., via creating tags). One of the users she followed turns out to be a NYU pre-med student who has left another tag at the entrance to another dorm reading, "welcome party tonight." Monica drops her own tag at the breakfast place reading, "Delicious. New York, I think I love you. Sit right here for a heavenly breakfast."

As another example, Michael is a marketing executive attending a new trade show in Boston, a city he has never been to. He opens the messaging system and follows his hotel. All tags created by his hotel show up, including places to eat, transit stops, and where to catch the airport shuttle with the schedule. He turns off the hotel filter and moves the map to show the subway station, where he finds tags for each of a place to buy a paper, a place to get coffee, exactly where the subway entrance is, and where to buy a ticket. Michael then moves the map to the station near the trade show convention center and finds tags recommending the best spot to catch a cab, which he will take to the convention center. He follows the convention center and sees all tags created by the convention center, including tags for bathrooms, entrances and when they are open, and places to eat. He then follows his boss who has left tags of where to meet and when, and where the client dinner will be held, including a link to the client's LinkedIn profile. As he leaves his hotel, Michael drops a tag in the hotel lobby with a message to meet on this spot for drinks after dinner, and sends it to his best customer via text.

As another example, Paul is a new driver for the United Parcel Service (UPS®), and is subbing on a route. He opens the messaging system where he has been granted permission to access private tags by UPS and opens the filter for the route he is on. Tags are left along his route with helpful notes such as, "little dog barks but doesn't bite, name is Daisy," "Don't double park here, owner gets pissed," and "Mrs. Smith moves slow, takes a minute to get to the door." He pulls up to a gate to make a delivery and sees a tag reading "gate is locked from the outside, but reach through hole in mesh to open, leave package under bench by front door." Paul opens the gate as instructed and knocks on the door, but sees there is no bench. When the customer opens the door, he asks the customer to sign and mentions he had a note to leave the package under the bench. The customer informs Paul that packages can be left inside a chest. Paul heads back to the truck and adds to the tag, "leave packages inside chest next to front door." The messaging system can track and report Paul's activity (e.g., location, activity, etc.) to UPS.

As another example, a small city department creates a city department category in the messaging system. Residents of the city report potholes, crimes, or anything that needs the city's attention via creating tags under the city department category in the messaging system. The city department can respond to the tags by fixing the problems and updating the tag with a photo of the fixed problem for all to see. The messaging system may deliver a report to the mayor of the city, such as on how efficiently the city department is addressing citizen concerns.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for sharing location specific information, comprising:
    (a) receiving, by one or more processors, first instructions for a first tag, wherein said first instructions comprise a first message about a first location and first coordinates for said first location, wherein said first location is a location at a first degree of specificity;
    (b) receiving, by said one or more processors, second instructions for a second tag, wherein said second instructions comprise a second message about a second location and second coordinates for said second location, wherein said second location is a location at a second degree of specificity different from said first degree of specificity; and
    (c) displaying, by said one or more processors, said first tag and said second tag on a map-based interface, wherein (i) said first tag is positioned on said map-based interface on or adjacent to said first location according to said first coordinates and (ii) said second tag is positioned on said map-based interface on or adjacent to said second location according to said second coordinates.

2. The method of claim 1, wherein said first location is a building, and said second location is a furniture, floor, elevator, stairway, window, door, entranceway, or gate of said building.

3. The method of claim 1, wherein said first location is a continent, country, state, city, county, neighborhood, block, street, alley, intersection, walkway, car lane, path, building, furniture, floor, elevator, stairway, window, door, entranceway, gate, bridge, tunnel, zip code, district, zone, region, campus, ocean, river, stream, park, forest, mountain, landmark, or a natural or artificial boundary or object that is isolated as a separate location.

4. The method of claim 1, wherein said first tag comprises one or more distinguishing features more proximal to an edge, corner, tip, or boundary of the tag, relative to another edge, corner, tip, or boundary of the tag, to distinguish an orientation of said tag.

5. The method of claim 4, wherein said first tag comprises a tip, and wherein said first tag is positioned on said map-based interface on or adjacent to said first part of said location to point, via said tip, said first location.

6. The method of claim 1, wherein said first tag displays at least a portion of said first message about said first location on said map-based interface.

7. The method of claim 6, wherein said at least said portion of said first message comprises one or more information selected from the group consisting of a title of said first message, a category of said first location, a description of said first location, and an aggregate rating of said first message.

8. The method of claim 1, wherein said first tag does not display said first message on said map-based interface.

9. The method of claim 1, wherein said first message comprises one or more information selected from the group consisting of a title of said first message, a category of said first location, a description of said first location, and an aggregate rating of said first message.

10. The method of claim 9, wherein said aggregate rating of said first message is a compilation of individual ratings received for said first message, and further comprising receiving, from a user, an individual rating for said first message.

11. The method of claim 10, further comprising permitting said user to provide said individual rating based on one or more members selected from the group consisting of (i) confirming that said user has visited said first location using one or more geolocation sensors, (ii) confirming that the user has viewed all of said first message, and (iii) confirming that an authoring user of said first message permitted said user to provide said individual rating.

12. The method of claim 1, wherein said first tag has a default state and an active state, wherein said first tag is configured to display a first set of information of said first message in said default state, and wherein said first tag is configured to display a second set of information of said first message in said active state, wherein said second set of information is different from said first set of information.

13. The method of claim 12, wherein said first tag alternates between said default state and said active state upon a user action.

14. The method of claim 12, wherein said first tag is enlarged in said active state compared to said default state.

15. The method of claim 1, further comprising (d) filtering a plurality of tags displayed on said map-based interface with a filter, to display a subset of said plurality of tags, wherein said subset of said plurality of tags comprises said first tag and said second tag.

16. The method of claim 1, wherein said first tag is a private tag associated with one or more users.

17. The method of claim 1, wherein said first tag is a public tag associated with all users.

18. The method of claim 1, further comprising displaying a current location of a user on said map-based interface.

19. The method of claim 18, further comprising providing direction instructions between said current location of said user and said first location or said second location.

20. The method of claim 1, wherein said first tag is associated with an expiration date or time, and further comprising removing said first tag from said map-based interface after said expiration date or time.

* * * * *